US007526145B2

(12) United States Patent
Mori

(10) Patent No.: US 7,526,145 B2
(45) Date of Patent: Apr. 28, 2009

(54) OPTICAL SCANNING DEVICE AND IMAGE FORMING APPARATUS USING THE SAME

(75) Inventor: Seiichiro Mori, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1041 days.

(21) Appl. No.: 10/938,601

(22) Filed: Sep. 13, 2004

(65) Prior Publication Data

US 2005/0057636 A1 Mar. 17, 2005

(30) Foreign Application Priority Data

Sep. 16, 2003 (JP) ............................ 2003-322814

(51) Int. Cl.
*G06K 9/20* (2006.01)
*B41J 27/00* (2006.01)

(52) U.S. Cl. ........................ 382/317; 347/258; 358/475

(58) Field of Classification Search ................. 358/475; 382/317-319; 347/241-244, 256-259
See application file for complete search history.

(56) References Cited

U.S. PATENT DOCUMENTS 6,507,427 B1 1/2003 Yamawaki .................. 359/210
6,791,728 B2 9/2004 Mori .......................... 359/204
6,927,883 B1 * 8/2005 Fujimoto .................... 358/484
6,933,961 B2 * 8/2005 Kato .......................... 347/258
2004/0017552 A1 1/2004 Mori et al. .................... 355/41

FOREIGN PATENT DOCUMENTS

JP 2001-21822 1/2001

* cited by examiner

*Primary Examiner*—Wesley Tucker
(74) *Attorney, Agent, or Firm*—Fitzpatrick, Cella, Harper & Scinto

(57) ABSTRACT

Provided is an optical scanning device, including a light source, an incident optical system for allowing a light beam emitted from the light source to enter a deflection surface of a deflector at a predetermined angle within a sub scanning section, and an imaging optical system for guiding the light beam deflected on the deflector to a surface to be scanned, the imaging optical system including at least one optical element. The at least one optical element constituting the imaging optical system includes a plurality of regions which have different refractive powers in a main scanning direction within a sub scanning section. The light beam from the incident optical system passes through a region of the plurality of regions, which has a refractive power, and the light beam deflected on the deflection surface is entered on another region of the plurality of regions, which has another refractive power. Therefore, compact optical scanning device, in which the deterioration of the optical performance in the oblique incident system can be suppressed and a generation of a refractive index gradient during lens manufacturing can be also suppressed, and image forming apparatus using the optical scanning device can be provided.

18 Claims, 8 Drawing Sheets

OPTICAL SCANNING DEVICE AND IMAGE FORMING APPARATUS USING THE SAME

BACKGROUND OF THE INVENTION

1. Field of the Invention

The present invention relates to an optical scanning device and an image forming apparatus using the same. In particular, the present invention relates to an optical scanning device suitable for an image forming apparatus such as a laser beam printer, a digital copying machine, or a multi-function printer, which has, for example, an electrophotographic process and employs a structure in which a light beam emitted from a light source means is allowed to enter into an optical deflector within a sub scanning section at a predetermined angle, and the light beam which is deflected and reflected by the optical deflector is guided onto a surface to be scanned to record image information.

2. Related Background Art

In recent years, in an optical scanning device used for an image forming apparatus such as a laser beam printer, a digital copying machine, or a multi-function printer, in order to realize increases in scanning speed and resolution of the optical scanning device, there has been utilized an overfilled scanning optical system (hereinafter also referred to as "an OFS scanning optical system") using a polygon mirror having small diameter thereof and including a large number of reflection surfaces (deflection surfaces) as a deflection means (for example, see JP 2001-021822).

In the overfilled scanning optical system, the number of surfaces can be increased without increasing the size of the polygon mirror. Therefore, high speed scanning can be performed while a load to a motor for driving the polygon mirror is reduced.

In order to make the entire optical scanning device compact, for example, the following manners have been used. (1) A scanning lens system is composed of a single lens. (2) A scanning lens system designed for a wide view angle is disposed near the optical deflector to reduce the external size of the scanning lens system. (3) The length of an optical path is shortened.

When the OFS scanning optical system is employed, the system is generally configured as a so-called oblique incident system that allows light from the outside of a main scanning plane (in sub scanning section) to enter the deflection surface of the optical deflector. In order to uniform the amount of light on a surface to be scanned (image plane), it is desirable to allow a light beam to enter the deflection surface from the front within a main scanning section.

Here, if an interval between the scanning lens system and the optical deflector is configured short in order to reduce the size of the optical scanning device, a necessary and sufficient oblique incident angle must be set to prevent the light beam which is deflected on the deflection surface and travels to the surface to be scanned from being blocked by elements composing an incident optical system. However, when the oblique incident angle is set to a very large value, a scanning line is curved.

Thus, it is also possible to set the oblique incident angle to a small value by lengthening a distance between the deflection surface and the optical system disposed in front of the deflection surface. However, when an optical path up to the deflection surface on which light is incident is lengthened, the size of the entire optical scanning device increases.

On the other hand, the width of lenses composing the scanning lens system in the sub scanning direction is shortened to obtain a structure in which an incident light beam on the deflection surface does not pass through the scanning lens. Therefore, the incident light beam on the deflection surface can be easily transmitted. However, in such a case, a refractive index gradient (hereinafter also referred to as "GI") from a central portion of the scanning lens to a peripheral portion thereof during lens manufacturing is likely to influence, thereby deteriorating optical performance. Thus, the width of the scanning lens cannot be significantly shortened in the sub scanning direction.

In the case where there is a variation in environment, such as a change in ambient temperature, for example, when an optical resin lens is used for the scanning lens system, a change in magnification in the main scanning direction particularly becomes a problem. In addition, in the case of the OFS scanning optical system having a so-called double path in which light passes through the same lens twice before and after the deflection and reflection as described above, the influence of the change of magnification is large.

In actual, it is necessary to separate the scanning lens system from the optical deflector at a distance such that a predetermined width is provided in the sub scanning direction to prevent the incident light beam on the deflection surface from being blocked. This inhibits a reduction in size of the optical scanning device.

SUMMARY OF THE INVENTION

An object of the present invention is to provide an optical scanning device that is compact and can suppress a deterioration of an optical performance which is caused in an oblique incident system and a generation of a refractive index gradient of a lens during lens manufacturing, and an image forming apparatus using the optical scanning device.

According to one aspect of the invention, an optical scanning device includes: a light source means; an incident optical system for allowing a light beam emitted from the light source means to enter a deflection surface of a deflection means at a predetermined angle within a sub scanning section; and an imaging optical system including at least one optical element guiding the light beam deflected on the deflection means to a surface to be scanned, in which the at least one optical element included in the imaging optical system includes a plurality of regions which have different refractive powers in a main scanning direction within a sub scanning section, the light beam from the incident optical system passes through a region of the plurality of regions, which has a refractive power, and the light beam deflected on the deflection surface is entered on a region of the plurality of regions, which has another refractive power.

In further aspect of the invention, a refractive power of the at least one optical element in the main scanning direction at a position through which the light beam from the incident optical system is transmitted is zero or substantially zero.

In further aspect of the invention, a surface on which the light beam from the incident optical system is incident, a surface from which the light beam from the incident optical system exits, or both of the surfaces of the at least one optical element are flat, and a diffraction grid is provided at a position of the flat surface through which the light beam is transmitted.

In further aspect of the invention, the at least one optical element includes a region through which the light beam from the incident optical system is transmitted and a region on which the light beam deflected on the deflection surface is entered within a sub scanning section, and refractive powers in the two regions within a main scanning section are different from each other.

In further aspect of the invention, a refractive power in the region through which the light beam from the incident optical system is transmitted within the sub scanning section is zero or substantially zero, and a refractive power within the main scanning section in the region on which the light beam deflected on the deflection surface is entered is set so as to provide an fθ characteristic by combining the refractive power with a refractive power of another optical element composing the imaging optical system.

In further aspect of the invention, a surface on which the light beam from the incident optical system is incident, and a surface from which the light beam from the incident optical system exits, or both of the surfaces of the at least one optical element are flat.

According to another aspect of the invention, an optical scanning device includes: a light source means; an incident optical system for allowing a light beam emitted from the light source means to enter a deflection surface of a deflection means at a predetermined angle within a sub scanning section; and an imaging optical system including at least one optical element for guiding the light beam deflected on the deflection means to a surface to be scanned, in which the at least one optical element included in the imaging optical system includes a cutaway region through which the light beam from the incident optical system is transmitted and a region through which the light beam deflected on the deflection surface is transmitted within a sub scanning section.

According to another aspect of the invention, an optical scanning device includes: a light source means; an incident optical system for allowing a light beam emitted from the light source means to enter a deflection surface of a deflection means at a predetermined angle within a sub scanning section; and an imaging optical system including at least one optical element for guiding the light beam deflected on the deflection means to a surface to be scanned, in which the at least one optical element included in the imaging optical system includes a reflection portion for guiding the light beam from the incident optical system to the deflection surface, and a surface through which the light beam deflected on the deflection surface is transmitted, the reflection portion being located outside an effective region used for guiding the light beam deflected on the deflection surface to the surface to be scanned.

In further aspect of the invention, the reflection portion is a reflective surface produced by metal vapor deposition.

In further aspect of the invention, the reflection portion is a reflective surface composed of a dielectric vapor deposition film.

According to another aspect of the invention, an optical scanning device includes: a light source means; an incident optical system for allowing a light beam emitted from the light source means to enter a deflection surface of a deflection means at a predetermined angle within a sub scanning section; and an imaging optical system including at least one optical element for guiding the light beam deflected on the deflection means to a surface to be scanned, in which the at least one optical element included in the imaging optical system includes a surface having a refractive power within a sub scanning section for guiding the light beam from the incident optical system to the deflection surface and a second surface through which the light beam deflected on the deflection surface is transmitted, the first surface being disposed in a part of an effective region used for guiding the light beam deflected on the deflection surface to the surface to be scanned, or a part other than the effective region.

According to another aspect of the invention, an image forming apparatus includes: the optical scanning device described above; a photosensitive member which is disposed on the surface to be scanned; a developing device for developing, as a toner image, an electrostatic latent image which is formed on the photosensitive member scanned with the light beam by the optical scanning device; a transferring device for transferring the developed toner image to a material to be transferred; and a fixing device for fixing the transferred toner image to the material to be transferred.

According to another aspect of the invention, an image forming apparatus includes: the optical scanning device described above; a printer controller for converting code data inputted from an external device into an image signal to output the image signal to the optical scanning device.

According to another aspect of the invention, a color image forming apparatus includes: a plurality of image bearing members, each of which are disposed on the surface to be scanned in the optical scanning device and forms different color image, respectively.

In further aspect of the invention, a color image forming apparatus further includes a printer controller for converting a color signal inputted from an external device into different color image data to output the color image data to the plurality optical scanning devices, respectively.

According to the present invention, as described above, by suitable setting a performance, a shape, and the like of the first scanning lens composing the imaging optical system in the optical scanning device including the oblique incident system, an optical scanning device capable of obtaining the following effects can be achieved.

(1) Because it is unnecessary to provide a large oblique incident angle in order to avoid the light beam being blocked by a scanning lens, a deterioration of an optical performance due to oblique incidence can be suppressed. In addition, since a necessary and sufficient thickness of the scanning lens can be ensured in the sub scanning direction, the generation of a refractive index gradient in the inner portion of the scanning lens during lens manufacturing can be suppressed.

(2) Since the number of transmission through a surface having an optical power of light beam can be reduced, even if the optical performance varies due to an environmental variation, the influence thereof can be minimized.

(3) Because the incident light beam can be traveled toward the deflection surface by providing the reflection portion in a part of the scanning lens, the degree of freedom can be improved in view of a layout.

Further, because a compact optical scanning device can be produced using such a simple structure without deteriorating the optical performance, it is possible to provide a high performance image forming apparatus in which a size of the entire apparatus is reduced.

DETAILED DESCRIPTION OF THE PREFERRED EMBODIMENTS

Embodiment 1

Figure 1:
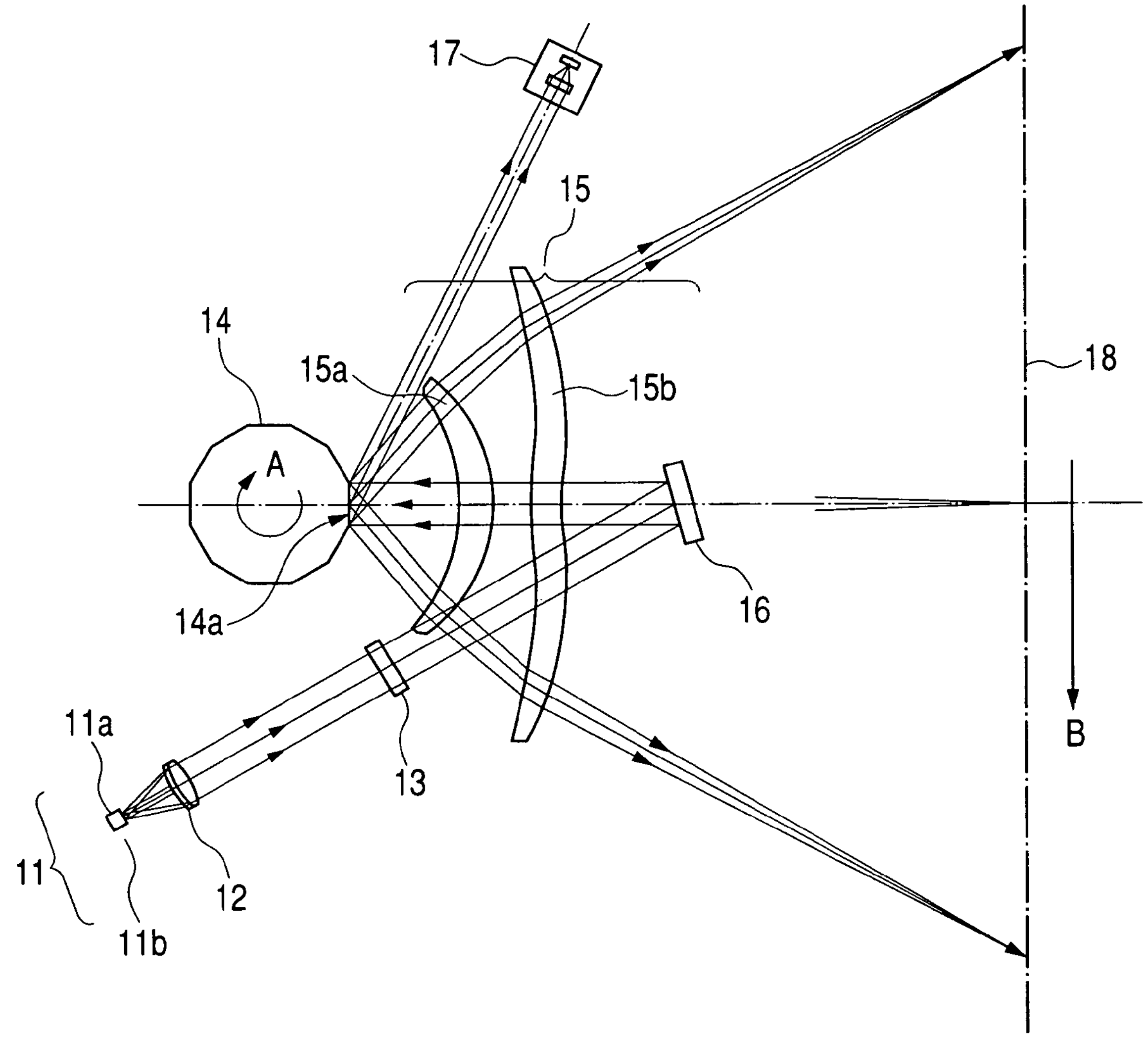
FIG. 1 is a main scanning sectional view of an optical scanning device according to Embodiment 1 of the present invention.
Figure 2:
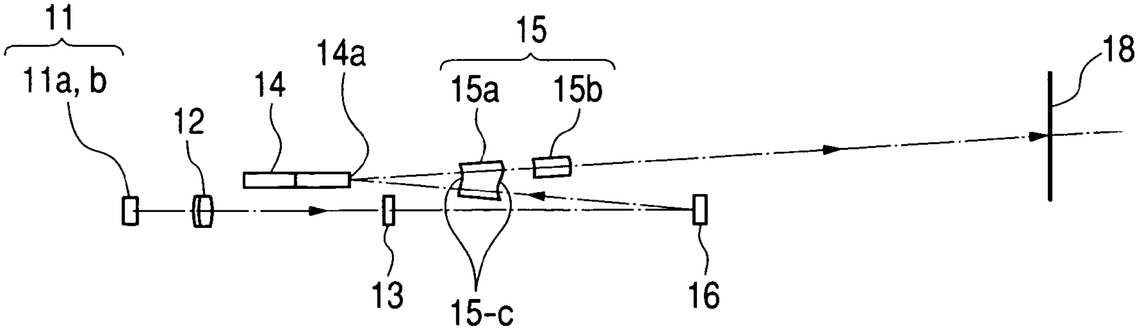
FIG. 2 is a sub scanning sectional view of the optical scanning device according to in Embodiment 1 of the present invention.
Figure 3A:
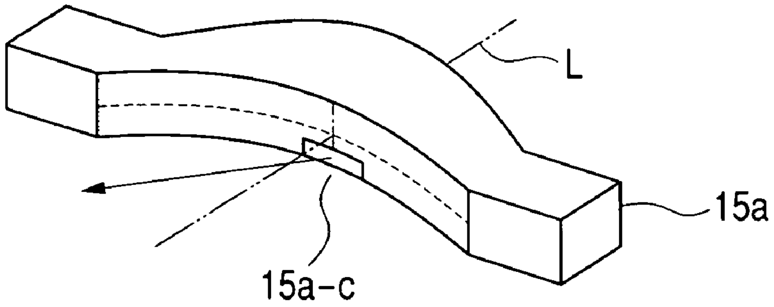
FIG. 3A is a main part perspective view showing a scanning lens according to Embodiment 1 of the present invention.
Figure 3B:
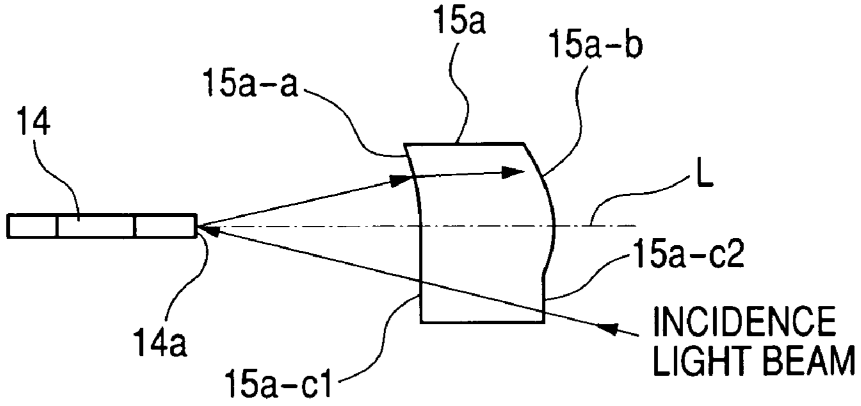
FIG. 3B is a sub scanning sectional view showing the scanning lens according to Embodiment 1 of the present invention.

FIG. 1 is a main part sectional view of the Embodiment 1 of the invention in a main scanning direction (main scanning sectional view). FIG. 2 is a main part sectional view in a sub scanning direction (sub scanning sectional view) of FIG. 1. FIG. 3A is a main part perspective view showing a first scanning lens shown in FIGS. 1 and 2. FIG. 3B is a sub scanning sectional view from a polygon mirror to the first scanning lens.

Here, the main scanning direction indicates a direction perpendicular to the rotational axis of a deflection means and to the optical axis of an imaging optical system (direction in which a light beam is deflected and reflected (deflected for scanning) by the deflection means). The sub scanning direction indicates a direction parallel to the rotational axis of the deflection means. The main scanning section indicates a plane that is parallel to the main scanning direction and includes the optical axis of the imaging optical system. The sub scanning section indicates a section perpendicular to the main scanning section.

In FIGS. 1 and 2, a light source means 11 is composed of a multi-laser light source having two light emission points 11_a_ and 11_b_. A common collimator lens 12 converts two light beams emitted from the light source means 11 into substantially parallel light beams, divergent light beams, or convergent light beams. A cylindrical lens 13 has a predetermined optical power only in the sub scanning section. The two light beams transmitted through the collimator lens 12 pass through the cylindrical lens 13 to be imaged on a deflection surface (reflection surface) 14_a_ of a polygon mirror 14 described later within the sub scanning section, forming linear images extended substantially in the main scanning direction. A return mirror 16 reflects the two light beams transmitted through the cylindrical lens 13 toward the polygon mirror 14. Note that each of the collimator lens 12, the cylindrical lens 13, the return lens 16, and the like configures an element of the incident optical system.

An optical deflector composed of a polygon mirror (rotating polygonal mirror) 14 serves as a deflection means and is rotated in a direction indicated by an arrow "A" in FIG. 1 at a constant rate by a drive means such as a motor (not shown).

In this embodiment, an overfilled optical system (OFS optical system) is provided, in which the two light beams emitted from the light source means 11 are allowed to enter the deflection surface 14_a_ of the polygon mirror 14 at a light beam width wider than the width of the deflection surface 14_a_ in the main scanning section.

The width of an incident light beam in the main scanning direction is determined according to the size of the polygon mirror 14. If necessary, an optical system for spreading the light beam in the main scanning direction, in which a concave lens, a convex lens, and the like are combined, may be disposed in addition to the collimator lens 12.

A scanning lens system (fθ lens system) 15 is an imaging optical system having a light condensing function and an fθ characteristic. The scanning lens system 15 includes first and second optical elements (scanning lenses) 15_a_ and 15_b_, each of which is made of an optical resin (plastic). The scanning lens system 15 has a tangle error correcting function, which can be attained by imaging the two light beams based on image information which are deflected and reflected by the polygon mirror 14 onto a photosensitive drum surface 18 serving as a surface to be scanned in the main scanning section, and by establishing a substantially optical conjugate relationship between the deflection surface 14_a_ of the polygon mirror 14 and the photosensitive drum surface 18 in the sub scanning section.

In this embodiment, the first scanning lens 15_a_ has a plurality of refractive powers in the main scanning direction within the same sub scanning section. A so-called double path is configured, in which the incident light beams from the incident optical system and the light beams deflected for scanning on the polygon mirror 14 are incident.

A detection portion 17 detects a light emission timing of the optical scanning device. In this embodiment, when the scanning light beams are entered on the detection portion 17 by the rotation of the polygon mirror 14, the detection portion 17 detects the light emission timings of the plurality of beams and generates detection signals. The detection signals are fed back to a light emission control portion (not shown) for the light source means, thereby controlling the light emission.

In this embodiment, the two light beams emitted from the light source means 11 are converted into the substantially parallel light beams by the collimator lens 12 and entered on the cylindrical lens 13. The substantially parallel light beams entered on the cylindrical lens 13 becomes convergent light beams within the sub scanning section. The convergent light beams are obliquely entered on the deflection surface 14_a_ of the polygon mirror 14 at a predetermined angle relative thereto through the return mirror 16. The incident light beams are imaged onto the vicinity of the deflection surface 14*a* to form substantially linear images (linear images extended in the main scanning direction) (oblique incident optical system).

The light beams reflected on the return mirror 16 pass through the first scanning lens 15*a* shown in FIG. 3A. As shown in FIG. 3B, in the first scanning lens 15*a*, flat portions 15*a-c*1 and 15*a-c*2 are provided in portions of both surfaces 15*a-a* and 15*a-b* (lower portions with respect to an optical axis L) through which the light beams are transmitted.

That is, refractive power in the main scanning direction at positions of the first scanning lens 15*a* through which the light beams from the incident optical system are transmitted are zero (or substantially zero). Here, "substantially zero" indicates two or more times longer than the focal length of the scanning lens system 15.

Therefore, the light beams reflected on the return mirror 16 are entered on the first scanning lens 15*a* from the flat portion 15*a-c*2, pass through the inner portion thereof, exits from the flat portion 15*a-c*1, and reaches the deflection surface 14*a*. When the light beams are entered on the first scanning lens 15*a* from the incident side, the light beams pass through the scanning lens 15*a* at a constant spreading angle without being influenced by convergence, divergence, and the like within both the main scanning section and the sub scanning section. Thus, as compared with the case where the light beams reflected on the return mirror 16 are avoided from traveling through the scanning lens system 15, an oblique incident angle can be set to a very small value.

On the other hand, the light beams within the main scanning section pass through the scanning lens 15*a* via the return mirror 16 without changing an optical state. Then, the light beams are entered on the deflection surface 14*a* as parallel light beams at the center of a deflection angle of the polygon mirror 14 or the substantial center thereof (front incidence).

As shown in FIG. 3B, the two light beams which are deflected and reflected on the deflection surface 14*a* of the polygon mirror 14 pass through regions of the first scanning lens 15*a*, which are used for optical scanning (upper portions with respect to the optical axis L). Then, the light beams are guided onto the photosensitive drum surface 18 after passing through the second scanning lens 15*b*.

The regions of the first scanning lens 15*a*, which are used for optical scanning, are configured in an optimum shape such that an fθ performance and a spot imaging performance are preferably corrected.

The photosensitive drum surface 18 is optically scanned in a direction indicated by an arrow B (main scanning direction) by rotating the polygon mirror 14 in the direction indicated by the arrow A. Thereby, an image is recorded on the photosensitive drum surface 18 of a photosensitive drum serving as a recording medium.

As described above, according to this embodiment, the regions having the plurality of different refractive powers in the main scanning direction within the same sub scanning section are provided in the first scanning lens 15*a*. The regions having the plurality of different refractive powers in the main scanning direction are formed in a continuous or discontinuous manner. When an optical resin is used as a material for producing such a single lens by injection molding, the lens can be easily manufactured in a shape having a plurality of characteristics within the same sub scanning section.

The flat portion 15*a-c*1 (15*a-c*2) of the first scanning lens 15*a* is not necessarily formed over the entire lens surface 15*a-a* (15*a-b*) but may be formed in only a portion of the region through which the incident light beam toward the polygon mirror is transmitted.

In this embodiment, the flat portions 15*a-c*1 and 15*a-c*2 are provided on both the lens surfaces 15*a-a* and 15*a-b* of the first scanning lens 15*a*. The present invention is not limited to this. The flat portion may be formed only on one of the lens surfaces.

When the thickness (height) of the lens in the sub scanning direction reduces, since a significant refractive index gradient (GI) is produced in the sub scanning direction during lens manufacturing as described above, the deterioration of the optical performance becomes a problem. However, according to this embodiment, the necessary and sufficient height in the sub scanning direction is obtained, so that a lens having a more stable optical performance can be formed.

When ambient temperature changes, the optical power is changed due to the change in refractive index of an optical resin. According to this embodiment, however, the portion of the first scanning lens, through which the light beam toward the polygon mirror transmits, is configured as the flat portions having no optical power. Therefore, as compared with the case where the light beams pass through the first scanning lens 15*a* twice as described above, the influence of the change in refractive index of the optical resin when the ambient temperature changes is halved. Thus, it is possible to provide a more stable optical scanning device.

As described above, in this embodiment, the regions having the plurality of different refractive powers in the main scanning direction within the same sub scanning section are provided in the first scanning lens 15*a* composing the imaging optical system. Therefore, it is possible to obtain a lens shape that suppresses the generation of the refractive index gradient during lens manufacturing and does not block the incident light beams on the deflection surface. In addition, the structure for suppressing the deterioration of the optical performance due to the variation in environment is used to obtain the stable optical performance.

In this embodiment, the multi-laser light source having the plurality of light emission points (laser elements) is used as the light source means. However, the present invention is not limited to this. A structure may be used in which a plurality of lasers, each of which has a single light emission point or a plural light emission points, are arranged and a necessary number of collimators and a necessary number of cylindrical lenses are arranged corresponding to the lasers. With respect to an example of an arrangement, there is a radiation arrangement in which the respective laser elements are arranged with an open angle relative to the deflection surface. The laser light source may also be composed of, for example, a system for combining light beams emitted from the respective laser elements using a prism and a mirror.

In this embodiment, the scanning lens system 15 is composed of two lenses. However, the present invention is not limited to this. The scanning lens system 15 may be composed of, for example, a single lens or three or more lenses. Further, the scanning lens system 15 is composed of lenses in this embodiment, however, the present invention is not limited to this, and it can be composed of a diffraction optical element.

Embodiment 2

Figure 4A:
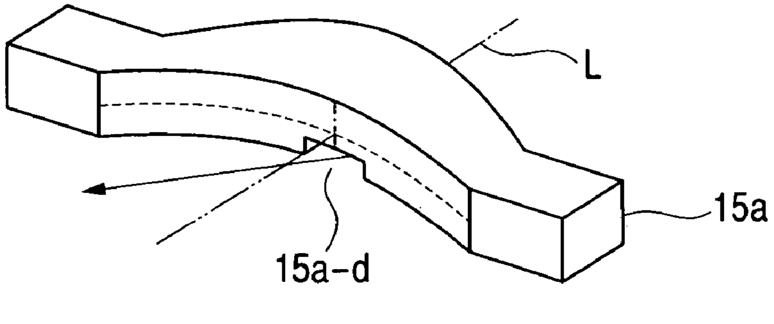
FIG. 4A is a main part perspective view showing a scanning lens according to Embodiment 2 of the present invention.
Figure 4B:
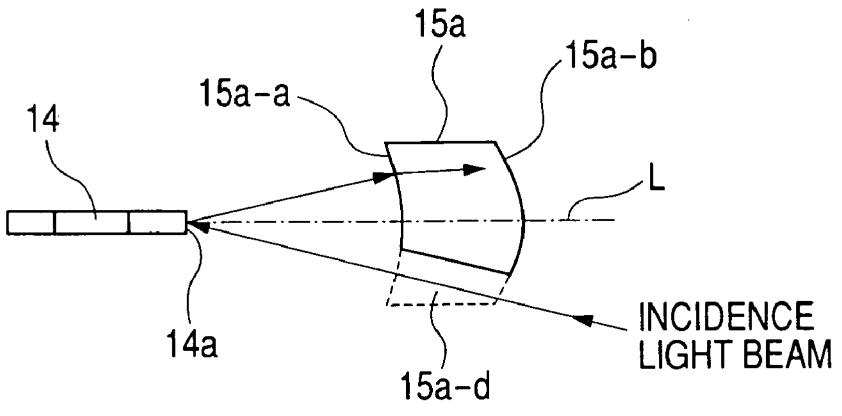
FIG. 4B is a sub scanning sectional view showing the scanning lens according to Embodiment 2 of the present invention.

FIG. 4A is a main part perspective view showing a first scanning lens according to Embodiment 2 of the present invention. FIG. 4B is a sub scanning sectional view showing from a polygon mirror to the first scanning lens. In FIGS. 4A and 4B, the same reference numerals are provided for the same elements as those shown in FIGS. 3A and 3B.

A difference between Embodiment 2 and Embodiment 1 described above is that a cutaway portion 15*a-d* is formed in Embodiment 2 instead of the flat portion 15*a-c* of the first-scanning lens 15*a* described in Embodiment 1. The other configurations and the other optical performances are substantially identical to those in Embodiment 1, so that the same effect is obtained.

The same cutaway portion as that described above may be formed in the second scanning lens 15*b*.

That is, in view of an environmental change tolerance, the cutaway portion 15*a-d* as shown in FIGS. 4A and 4B is formed instead of the flat portion 15*a-c* as shown in FIGS. 3A and 3B so that no optical power of lens surfaces exists in the optical path and that the shift of an optical path doesn't exist, which happens when the light beam passes through parallel surfaces. Therefore, the influence of the environment can be further reduced.

In this case, when the cutaway portion 15*a-d* is formed only in a portion of the first scanning lens 15*a*, it is unnecessary to shorten the entire first scanning lens in the sub scanning direction. Therefore, a problem related to the influence of the refractive index gradient (GI) does not occur as in Embodiment 1.

The cutaway portion 15*a-d* may be manufactured as a molded original cutaway structure by an injection molding or cut out by cutting or the like after injection molded.

Embodiment 3

Figure 5A:
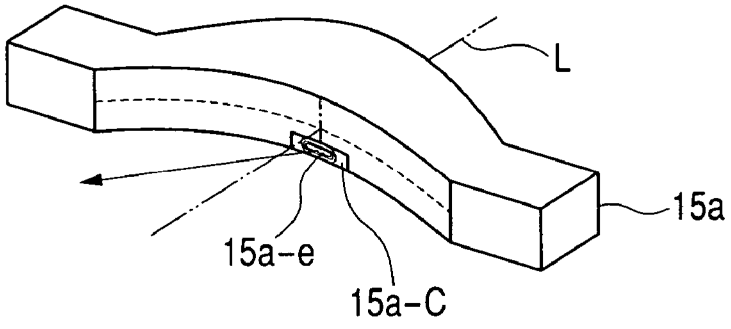
FIG. 5A is a main part perspective view showing a scanning lens according to Embodiment 3 of the present invention.
Figure 5B:
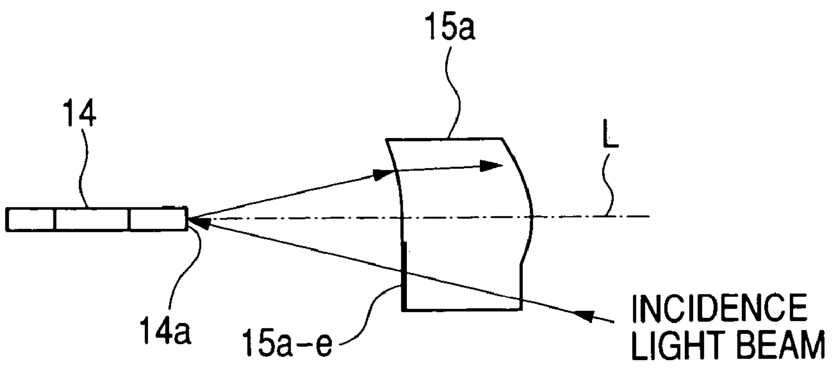
FIG. 5B is a sub scanning sectional view showing the scanning lens according to Embodiment 3 of the present invention.

FIG. 5A is a main part perspective view showing a first scanning lens according to Embodiment 3 of the present invention. FIG. 5B is a sub scanning sectional view showing from a polygon mirror to the first scanning lens. In FIGS. 5A and 5B, the same reference numerals are provided for the same elements as those shown in FIGS. 3A and 3B.

A difference between the Embodiment 3 and Embodiment 1 described above is that a diffraction grid (diffraction grid portion) 15*a-e* is formed in a part of the flat portion 15*a-c*, where a light beam transmit, of the first scanning lens 15*a* described in Embodiment 1. The other structures and the other optical performances are substantially identical to those in Embodiment 1, so that the same effect can be obtained.

That is, in this embodiment, as shown in FIGS. 5A and 5B, the diffraction grid 15*a-e* is formed in the part of the flat portion 15*a-c* through which light beams transmit on an incident path to the optical deflector (polygon mirror). Therefore, the influence of the variation in environment is further actively corrected.

In this embodiment, as shown in FIG. 5B, the diffraction grid 15*a-e* has a optical power in the main scanning direction, so that the focal point of the scanning lens which is shifted due to a variation in refractive index is corrected in the case where a temperature or the like changes. That is, a refractive index of the optical resin, which is a lens material, becomes lower as temperature rises. Therefore, the focal length is lengthened to form an image behind the surface to be scanned. Similarly, the oscillation wavelength of the semiconductor laser serving as the light source means becomes longer as temperature rises. Therefore, the focal length caused by the diffraction grid becomes shorter according to the change of the oscillation wavelength. By utilizing such two optical characteristics, when the optical power of the diffraction grid is suitably set so as to prevent the focal point on the surface to be scanned from being shifted, even if the environment varies, the change of the focal point can be minimized. Thus, stable optical performance can be maintained.

In this embodiment, the diffraction grid 15*a-e* is formed in the part of the region through which incident light beams on the deflection surface transmit. However, the present invention is not limited to this. The diffraction grid 15*a-e* may be formed on the entire surface including the region through which the incident light beams transmit. If necessary, the optical power can be also provided in the sub scanning direction.

Embodiment 4

Figure 6A:
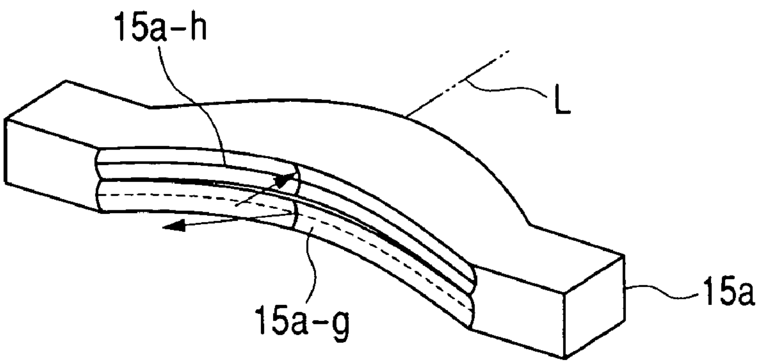
FIG. 6A is a main part perspective view showing a scanning lens according to Embodiment 4 of the present invention.
Figure 6B:
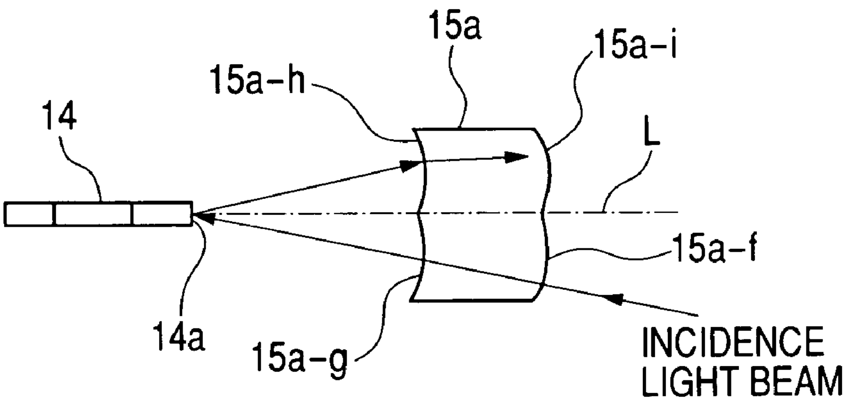
FIG. 6B is a sub scanning sectional view showing the scanning lens according to Embodiment 4 of the present invention.

FIG. 6A is a main part perspective view showing a first scanning lens according to Embodiment 4 of the present invention. FIG. 6B is a sub scanning sectional view showing from a polygon mirror to the first scanning lens. In FIGS. 6A and 6B, the same reference numerals are provided for the same elements as those shown in FIGS. 3A and 3B.

A difference between Embodiment 4 and Embodiment 1 described above is that a total optical power in a portion used for incident beams on the deflection surface is set to substantially zero in Embodiment 4, and which is made different from a total optical power in a portion used for light beams traveling from the deflection surface to the surface to be scanned within the same sub scanning section. The other structures and the other optical performances are substantially identical to those in Embodiment 1, so that the same effect can be obtained.

That is, in this embodiment, a lower region of the first scanning lens 15*a* in the sub scanning direction with respect to the optical axis L is used for the incident beams on the deflection surface. An upper region of the first scanning lens 15*a* is used for the imaging side on the surface to be scanned after the deflection and reflection on the deflection surface. In this embodiment, as shown in FIG. 6B, the light beams reflected on the return mirror 16 are entered on an incident portion 15*a-f* of the first scanning lens 15*a* and exit from an exit portion 15*a-g*.

The incident portion 15*a-f* and the exit portion 15*a-g* each have a cylindrical surface having an optical power within the main scanning section of zero (no optical power) or substantially zero (two or more times as long as the focal length of the scanning lens system). Therefore, when the light beams pass through the lower portion of the first scanning lens 15*a*, the light beams are not refracted in the main scanning direction. The optical power for forming an image on the deflection surface is provided in the sub scanning section, so that the light beams exited from the incident optical system are imaged on the deflection surface in the sub scanning section.

As shown in FIG. 6B, the light beams which are deflected and reflected on the deflection surface 14*a* are entered on an incident portion 15*a-h* of the first scanning lens 15*a*, exit from an exit portion 15*a-i*, and travel toward the surface to be scanned.

The incident portion 15*a-h* and the exit portion 15*a-i* in an upper region with respect to the optical axis L have optical powers different from those of the incident portion 15*a-f* and of the exit portion 15*a-g* in a lower region, in both the main scanning section and the sub scanning section. The incident portion 15*a-f* and the exit portion 15*a-g* each have a no optical power in the main scanning section. In contrast to this, the incident portion 15*a-h* and the exit portion 15*a-i* are configured such that the two-lens structure composed of the first and second scanning lenses 15*a* and 15*b* has an fθ characteristic and an imaging characteristic.

The two-lens structure has the optical performance of a so-called tangle error correcting system for imaging the light beams which are converged on the deflection surface 14*a* on the surface to be scanned 18 such that a conjugate relationship is made between the deflection surface 14*a* and the surface to be scanned 18 at a predetermined magnification in the sub scanning section.

Figure 7:
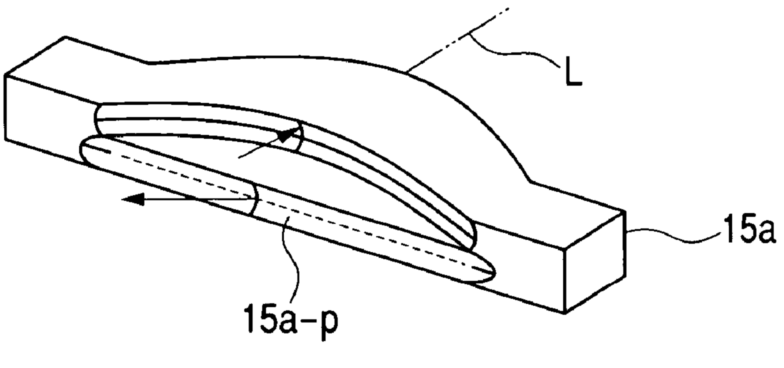
FIG. 7 is a main part perspective view showing a scanning lens according to Embodiment 4 of the present invention.
Figure 8:
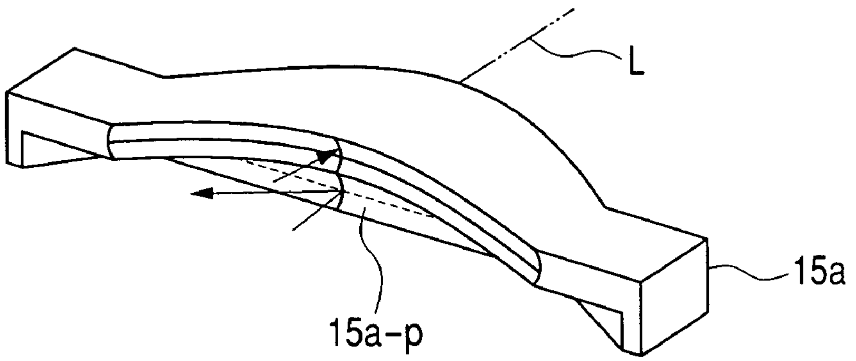
FIG. 8 is a main part perspective view showing the scanning lens according to Embodiment 4 of the present invention.

In order to make the optical power on the incident side in the main scanning section configured to a no optical power (or substantially zero), for example, a configuration in which no curvature is provided for each of lens surfaces in the main scanning section may be used as shown in FIG. 7 or 8.

Figure 9:
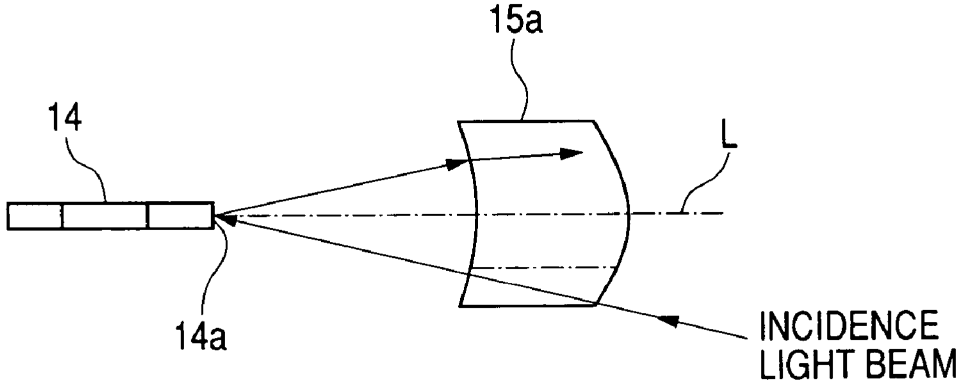
FIG. 9 is a sub scanning sectional view showing the scanning lens according to Embodiment 4 of the present invention.

In FIGS. 7 and 8, the incident light beams toward the deflection surface are transmitted through a no optical power portion 15*a-p*. Therefore, an oblique incident angle is reduced to reduce the size of the entire optical scanning device. FIG. 9 is a sub scanning sectional view in FIGS. 7 and 8. In FIGS. 7, 8, and 9, the same reference numerals are provided for the same elements as those shown in FIGS. 3A and 3B.

Embodiment 5

Figure 10:
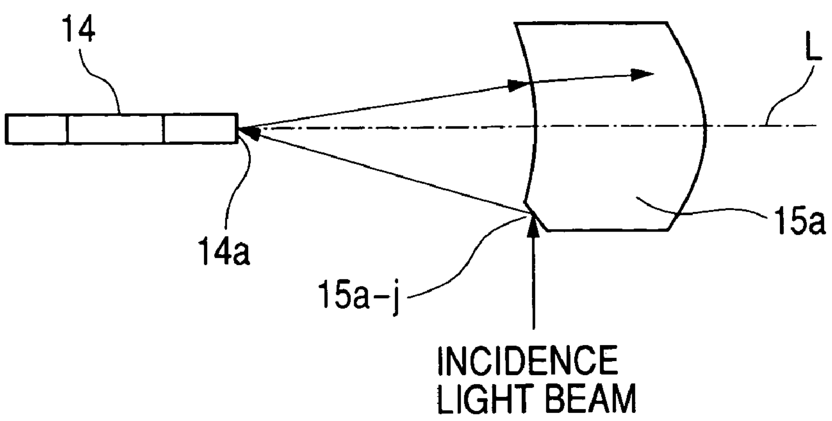
FIG. 10 is a sub scanning sectional view showing a scanning lens according to Embodiment 5 of the present invention.
Figure 11:
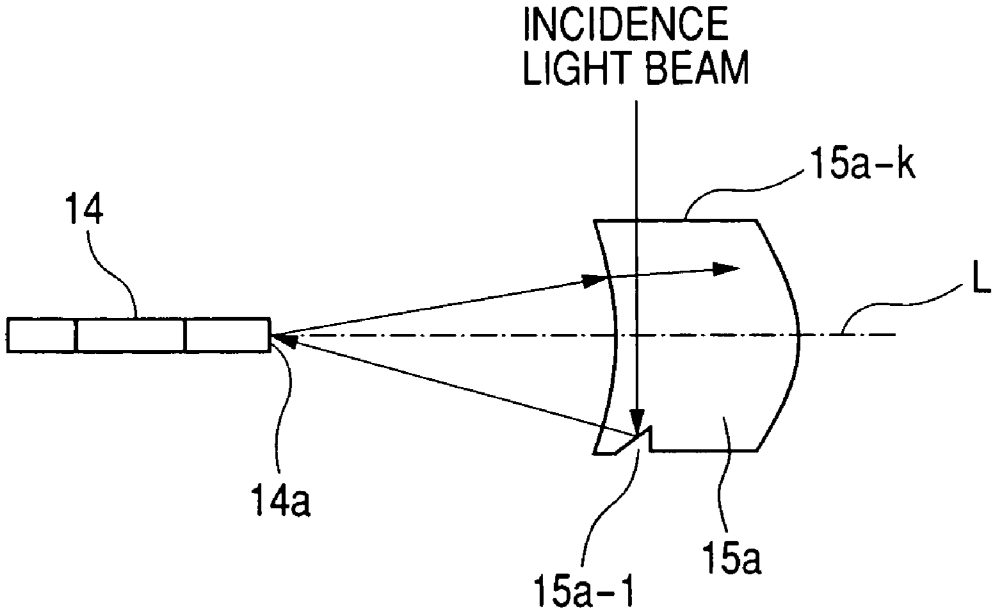
FIG. 11 is a sub scanning sectional view showing the scanning lens according to Embodiment 5 of the present invention.

FIGS. 10 and 11 are sub scanning sectional views showing from a polygon mirror to a first scanning lens in Embodiment 5 of the present invention. In FIGS. 10 and 11, the same reference numerals are provided for the same elements as those shown in FIG. 3B.

A difference between Embodiment 5 and Embodiment 1 described above is that a reflection portion 15*a-j* (15*a-l*) for guiding the light beams from the incident optical system to the deflection surface is provided outside an effective region of the first scanning lens 15*a* in order to guide the light beams deflected on the polygon mirror 14 to the surface to be scanned 18.

In Embodiments 1 to 4 described above, the light beams traveling toward the polygon mirror are transmitted through the cutaway portion, the flat surface, or the like to reduce the oblique incident angle. On the other hand, in this embodiment, the reflection portion is provided outside the effective region of the scanning lens to prevent light from being blocked by the scanning lens. Therefore, the oblique incident angle is reduced to suppress the deterioration of the optical performance, which occurs in the oblique incident system. The other structures and the other optical performances are substantially identical to those in Embodiment 1, so that the same effect can be obtained.

That is, in FIG. 10, the light beams emitted from the light source means are shaped by the collimator lens, the cylindrical lens, and the like. After that, the shaped light beams are allowed to vertically enter the reflection portion 15*a-j* of the first scanning lens 15*a* from the sub scanning direction. The light beams which are reflected on the reflection portion 15*a-j* travel toward the deflection surface 14*a*. Then, the light beams return to the first scanning lens 15*a*. The scanning is performed according to the rotation of the optical deflector (polygon mirror) 14.

The reflection portion 15*a-j* is composed of a reflective film formed by vapor deposition of metal such as aluminum on a lens surface processed as a mirror surface, however, the same effect can be obtained by vapor deposition of dielectric material.

When it is hard to allow light to enter the reflection portion from the lower side in the sub scanning direction as shown in FIG. 10 in a structure of the optical scanning device, it is also possible to allow light to enter the reflection portion 15*a-j* from the upper side in the sub scanning direction as shown in FIG. 11, for example.

The structure shown in FIG. 11 may be configured upside down, however, here, an upper flat portion 15*a-k* of the first scanning lens 15*a* is formed as a mirror surface and the reflection portion 15*a-l* is provided in a lower flat portion.

The reflection portion 15*a-l* shown in FIG. 11 is configured as a reflective surface made of a metallic film as in the case of the reflection portion 15*a-j* shown in FIG. 10. In FIG. 11, the light beams exited from the incident optical system are vertically entered on the mirror surface 15*a-k* from the upper side in the sub scanning direction. The incident light beams pass through the inner portion of the first scanning lens 15*a* without changing an optical state. The light beams are reflected on the reflection portion 15*a-l* and then travel to the reflection surface 14*a*.

As described above, according to this embodiment, the degree of freedom for the arrangement of the incident optical system can be increased by the above-mentioned means. Thus, the structure of the entire optical scanning device can be made compact.

Embodiment 6

Figure 12:
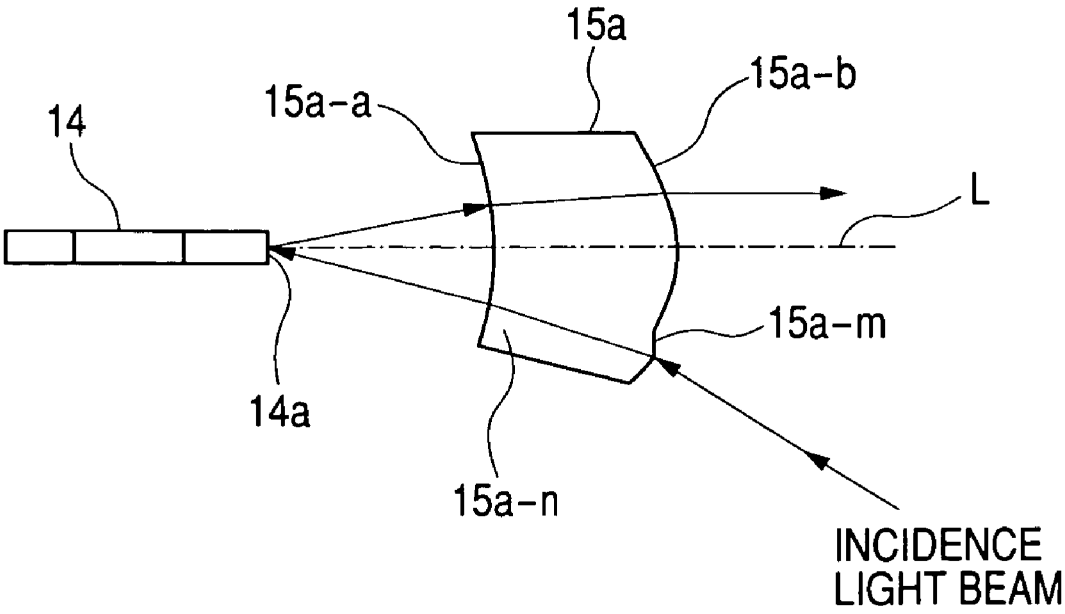
FIG. 12 is a sub scanning sectional view showing a scanning lens according to Embodiment 6 of the present invention.

FIG. 12 is a sub scanning sectional view showing from a polygon mirror to a first scanning lens in Embodiment 6 of the present invention. In FIG. 12, the same reference numerals are provided for the same elements as those shown in FIG. 3B.

A difference between Embodiment 6 and Embodiment 1 described above is as follows. A surface, which has refractive power in the sub scanning section, for guiding the light beams from the incident optical system to the deflection surface is provided in a part of the effective region of the first scanning lens 15*a* for guiding the light beams deflected on the polygon mirror 14 to the surface to be scanned 18 or in a region other than the effective region thereof (region which is not used for scanning). The cylindrical lens 13 of the incident optical system is omitted. The other structures and the other optical performances are substantially identical to those in Embodiment 1, so that the same effect can be obtained.

That is, in this embodiment, the incident light beams are entered on a refraction portion 15*a-m* of the first scanning lens 15*a*. The refraction portion 15*a-m* is a surface that is a part of the first scanning lens 15*a* and that has an optical power in only the sub scanning section, and has an optical power different from that in the region to be used for scanning. A function corresponding to that of the cylindrical lens 13 which is disposed in each of the embodiments described above and has the optical power within the sub scanning section, is imparted to the refraction portion 15*a-m*. Instead, the cylindrical lens 13 is omitted. Therefore, the light beams entered on the first scanning lens 15*a* are parallel light beams within both the main scanning section and the sub scanning section, are converged within the sub scanning section through the refraction portion 15*a-m* and a refraction portion 15*a-n* on the exit side, and imaged as focal lines on the deflection surface 14*a*.

With respect to an effect of the refraction portions, since the incident light beams can be bent in the sub scanning direction by the refraction portions, an oblique incident angle of the light beams from the incident optical system can be set to a large value while an oblique incident angle on the deflection surface is suppressed to a small value. Thus, the degree of freedom for the structure can be improved.

<Image Forming Apparatus>

Figure 13:
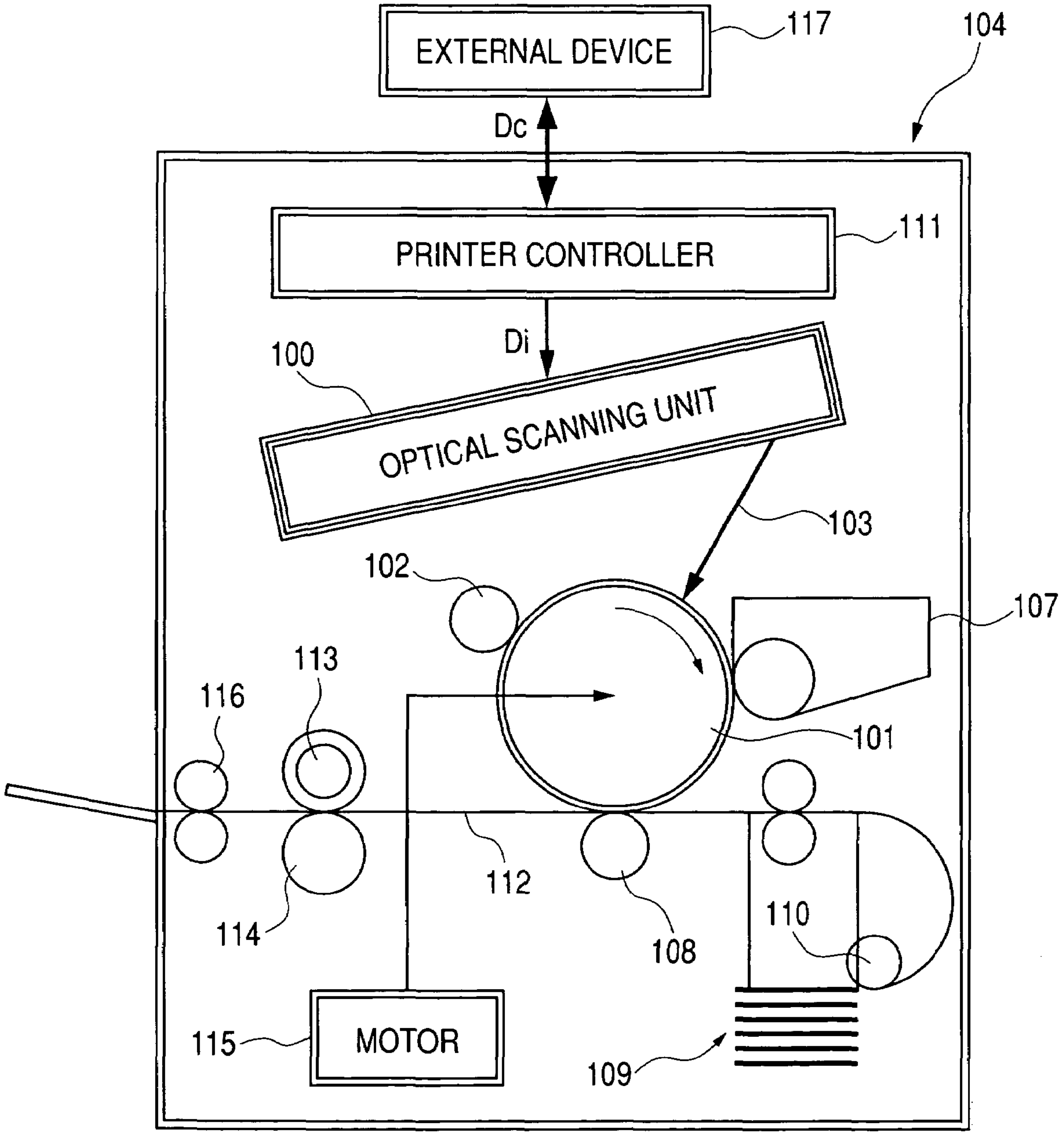
FIG. 13 is a main part sectional diagram showing an image forming apparatus of the present invention.

FIG. 13 a main part sectional view in the sub scanning direction, showing an image forming apparatus according to an embodiment of the present invention. In FIG. 13, reference numeral 104 denotes an image forming apparatus. Code data Dc is inputted from an external device 117 such as a personal computer to the image forming apparatus 104. The code data Dc is converted into image data (dot data) Di by a printer controller 111 in the image forming apparatus 104. The image data Di is inputted to an optical scanning unit 100 having the configuration indicated in any one of Embodiments 1 to 6. A light beam 103 modulated according to the image data Di is emitted from the optical scanning unit 100. A photosensitive surface of a photosensitive drum 101 is scanned with the light beam 103 in the main scanning direction.

The photosensitive drum 101 serving as an electrostatic latent image bearing member (photosensitive member) is rotated clockwise by a motor 115. According to the rotation, the photosensitive surface of the photosensitive drum 101 is moved in the sub scanning direction orthogonal to the main scanning direction with respect to the light beam 103. A charging roller 102 for uniformly charging the surface of the photosensitive drum 101 is provided above the photosensitive drum 101 so as to contact with the surface of the drum. The surface of the photosensitive drum 101 which is charged by the charging roller 102 is irradiated with the light beam 103 scanned by the optical scanning unit 100.

As described earlier, the light beam 103 is modulated according to the image data Di. The surface of the photosensitive drum 101 is irradiated with the light beam 103 to form an electrostatic latent image on the surface. The electrostatic latent image is developed as a toner image by a developing device 107 provided so as to contact with the photosensitive drum 101 in the downstream side of the irradiation position of the light beam 103 in the rotational direction of the photosensitive drum 101.

The toner image developed by the developing device 107 is transferred onto a sheet 112 serving as a material to be transferred by a transfer roller 108 provided below the photosensitive drum 101 so as to oppose to the photosensitive drum 101. The sheet 112 is stored in a sheet cassette 109 located in the front (right side in FIG. 13) of the photosensitive drum 101. The sheet can also be fed manually. A feed roller 110 is provided in the end portion of the sheet cassette 109. The sheet 112 in the sheet cassette 109 is sent to a transport path by the feed roller 110.

By the above operation, the sheet 112 onto which an unfixed toner image is transferred is further transported to a fixing device located in the rear (left side in FIG. 13) of the photosensitive drum 101. The fixing device is composed of a fixing roller 113 having a fixing heater (not shown) therein and a pressure roller 114 provided so as to press the fixing roller 113. The sheet 112 transported from the transferring part is heated while being pressurized in the press-contacting part which is composed of the fixing roller 113 and the pressure roller 114, so that the unfixed toner image on the sheet 112 is fixed. Further, a delivery roller 116 is provided in the rear of the fixing roller 113. The fixed sheet 112 is delivered to the outside of the image forming apparatus 104 by the delivery roller 116.

Although not shown in FIG. 13, the printer controller 111 conducts not only data conversion described earlier but also control of each part of the image forming apparatus 104, which is represented by the motor 115, control of a polygon motor in the optical scanning unit as described later, and the like.

<Color Image Forming Apparatus>

Figure 14:
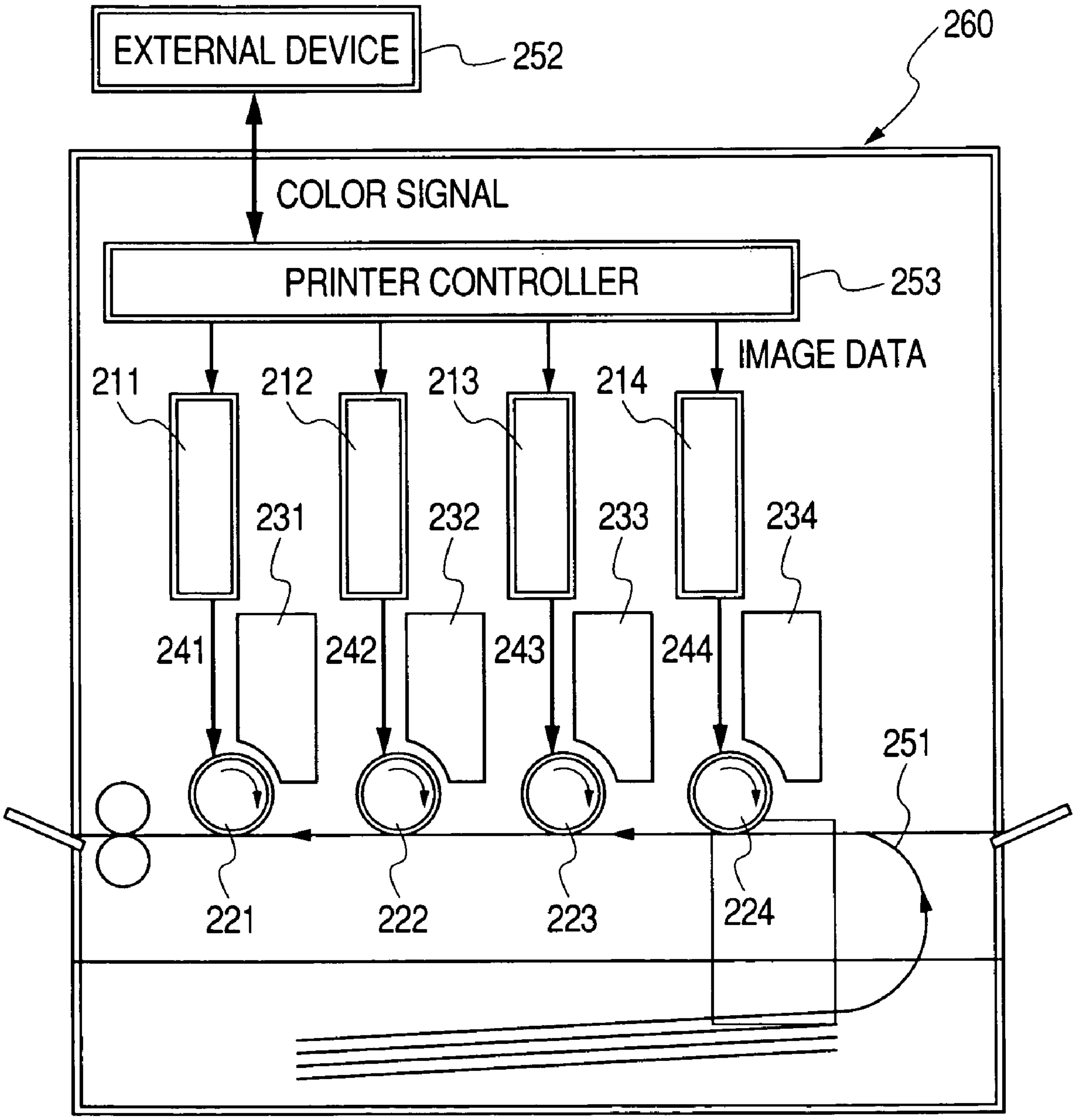
FIG. 14 is a main part sectional diagram showing a color image forming apparatus of the present invention.

FIG. 14 is a main part schematic diagram showing a color image forming apparatus according to an aspect of the present invention. This is a tandem type color image forming apparatus in which four optical scanning devices are arranged to record image information in parallel on the surface of the photosensitive drum serving as the image bearing member. In FIG. 14, reference numeral 260 denotes a color image forming apparatus. Reference numerals 211, 212, 21-3, and 214 denote the optical scanning device having the configuration described in any one of Embodiments 1 to 6. Reference numerals 221, 222, 223, and 224 denote the photosensitive drum serving as the image bearing member. Reference numerals 231, 232, 233, and 234 denote the developing unit. Reference numeral 251 denotes a transport belt.

In FIG. 14, respective color signals of R (red), G (green), and B (blue) are inputted from an external device 252 such as a personal computer to the color image forming apparatus 260. The color signals are converted into respective image data (dot data) of C (cyan), M (magenta), Y (yellow), and B (black) by a printer controller 253 in the color image forming apparatus 260. Those pieces of image data are separately inputted to the optical scanning devices 211, 212, 213, and 214. Light beams 241, 242, 243, and 244 modulated according to the respective image data are emitted from the optical scanning devices. The photosensitive surfaces of the photosensitive drums 221, 222, 223, and 224 are scanned with the light beams in the main scanning direction.

According to the color image forming apparatus in this aspect, the four optical scanning devices (211, 212, 213, and 214) are arranged corresponding to C (cyan), M (magenta), Y (yellow), and B (black). The image signals (image information) are recorded in parallel on the surfaces of the photosensitive drums 221, 222, 223 and 224, thereby printing a color image at high speed.

According to the color image forming apparatus in this aspect, as described above, the latent images of the respective colors are formed on the corresponding surfaces of the photosensitive drums 221, 222, 223, and 224 using the light beams based on the respective image data from the four scanning optical devices 211, 212, 213, and 214. After that, the multi-transfer is performed on a recording member to produce a full color image.

For example, a color image reading apparatus including a CCD sensor may be used as the external device 252. In this case, the color image reading apparatus and the color image forming apparatus 260 compose a color digital copying machine.

This application claims priority from Japanese Patent Application No. 2003-322814 filed on Sep. 16, 2003, which is hereby incorporated by reference herein.

What is claimed is:

1. An optical scanning device, comprising:

a light source means;

an incident optical system for allowing a light beam emitted from the light source means to enter a deflection surface of a deflection means at a predetermined angle within a sub scanning section; and an imaging optical system including at least one imaging optical element for imaging the light team deflected by the deflection means to a surface to be scanned, wherein the at least one imaging optical element included in the imaging optical system comprises a plurality of regions which have different refractive powers in a main scanning direction within a sub scanning section, the light beam from the incident optical system passes through a region of the plurality of regions, which has a refractive power in a main scanning direction, and the light beam deflected on the deflection surface is entered on a region of the plurality of regions, which has another refractive power in the main scanning direction.

2. An optical scanning device according to claim 1, wherein a refractive power of the at least one imaging optical element in the main scanning direction at a position through which the light beam from the incident optical system is transmitted is zero or substantially zero.

3. An optical scanning device according to claim 1, wherein a surface on which the light beam from the incident optical system is incident, a surface from which the light beam from the incident optical system exits, or both of the surfaces of the at least one imaging optical element are flat and a diffraction grid is provided at a position of the flat surface through which the light beam is transmitted.

4. An optical scanning device according to claim 1, wherein a surface on which the light beam from the incident optical system is incident, and a surface from which the light beam from the incident optical system exits, or both of the surfaces of the at least one imaging optical element are flat.

5. An optical scanning device, comprising:

a light source means;

an incident optical system for allowing a light beam emitted from the light source means to enter a deflection surface of a deflection means at a predetermined angle within a sub scanning section; and an imaging optical system including at least one imaging optical element for imaging the light beam deflected by the deflection means to a surface to be scanned, wherein the at least one imaging optical element included in the imaging optical system comprises a cutaway region through which the light beam from the incident optical system is transmitted and a region through which the light beam deflected on the deflection surface is transmitted within a sub scanning section.

6. An optical scanning device, comprising:

a light source means;

an incident optical system for allowing a light beam emitted from the light source means to enter a deflection surface of a deflection means at a predetermined angle within a sub scanning section; and an imaging optical system including at least one imaging optical element for imaging the light beam deflected by the deflection means to a surface to be scanned, wherein the at least one imaging optical element included in the imaging optical system comprises a reflection portion for guiding the light beam from the incident optical system to the deflection surface and a surface through which the light beam deflected on the deflection surface is transmitted, the reflection portion being located outside an effective region used for guiding the light beam deflected on the deflection surface to the surface to be scanned.

7. An optical scanning device according to claim 6, wherein the reflection portion is a reflective surface produced by metal vapor deposition.

8. An optical scanning device according to claim 6, wherein the reflection portion is a reflective surface composed of a dielectric vapor deposition film.

9. An optical scanning device, comprising:

a light source means;

an incident optical system for allowing a light beam emitted from the light source means to enter a deflection surface of a deflection means at a predetermined angle within a sub scanning section; and an imaging optical system including at least one imaging optical element for imaging the light beam deflected by the deflection means to a surface to be scanned, wherein the at least one imaging optical element included in the imaging optical system comprises a surface having a refractive power within a sub scanning section for guiding the light beam from the incident optical system to the deflection surface and a surface through which the light beam deflected on the deflection surface is transmitted, the first surface being disposed in a part of an effective region used for guiding the light beam deflected on the deflection surface to the surface to be scanned, or a part other than the effective region.

10. An image forming apparatus, comprising:

the optical scanning device according to any one of claim 1;

a photosensitive member disposed on the surface to be scanned;

a developing device for developing, as a toner image, an electrostatic latent image which is formed on the photosensitive member scanned with the light beam by the optical scanning device;

a transferring device for transferring the developed toner image to a material to be transferred; and a fixing device for fixing the transferred toner image to the material to be transferred.

11. An image forming apparatus, comprising:

the optical scanning device according to any one of claim 1; and a printer controller for converting code data inputted from an external device into an image signal to output the image signal to the optical scanning device.

12. An image forming apparatus, comprising:

the optical scanning device according to claim 5;

a photosensitive member disposed on the surface to be scanned;

a developing device for developing, as a toner image, an electrostatic latent image which is formed on the photosensitive member scanned with the light beam by the optical scanning device;

a transferring device for transferring the developed toner image to a material to be transferred; and a fixing device for fixing the transferred toner image to the material to be transferred.

13. An image forming apparatus, comprising:

the optical scanning device according to claim 5; and a printer controller for converting code data inputted from an external device into an image signal to output the image signal to the optical scanning device.

14. An image forming apparatus, comprising:

the optical scanning device according to claim 6;

a photosensitive member disposed on the surface to be scanned;

a developing device for developing, as a toner image, an electrostatic latent image which is formed on the photosensitive member scanned with the light beam by the optical scanning device;

a transferring device for transferring the developed toner image to a material to be transferred; and a fixing device for fixing the transferred toner image to the material to be transferred.

15. An image forming apparatus, comprising:

the optical scanning device according to claim 6; and a printer controller for converting code data inputted from an external device into an image signal to output the image signal to the optical scanning device.

16. An image forming apparatus, comprising:

the optical scanning device according to claim 9;

a photosensitive member disposed on the surface to be scanned;

a developing device for developing, as a toner image, an electrostatic latent image which is formed on the photosensitive member scanned with the light beam by the optical scanning device;

a transferring device for transferring the developed toner image to a material to be transferred; and a fixing device for fixing the transferred toner image to the material to be transferred.

17. An image forming apparatus, comprising:

the optical scanning device according to claim 9; and a printer controller for converting code data inputted from an external device into an image signal to output the image signal to the optical scanning device.

18. An optical scanning device according to claim 1, wherein the at least one imaging optical element comprises a region through which the light beam from the incident optical system is transmitted and a region on which the light deflected on the deflection surface is incident within a sub scanning section, and refractive powers in the two regions within a sub scanning section are different from each other.

* * * * *